United States Patent
Urakami et al.

(10) Patent No.: US 8,063,536 B2
(45) Date of Patent: Nov. 22, 2011

(54) OPTICAL APPARATUS

(75) Inventors: Toshifumi Urakami, Kawasaki (JP); Kaishi Ohashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 64 days.

(21) Appl. No.: 12/730,103

(22) Filed: Mar. 23, 2010

(65) Prior Publication Data
US 2010/0246001 A1    Sep. 30, 2010

(30) Foreign Application Priority Data
Mar. 25, 2009    (JP) ................. 2009-074859

(51) Int. Cl.
*H01L 41/08*    (2006.01)
(52) U.S. Cl. .............. 310/321; 310/316.01; 310/324; 310/328; 310/366
(58) Field of Classification Search .......... 310/321, 310/324, 328
See application file for complete search history.

(56) References Cited

U.S. PATENT DOCUMENTS

| | | | | |
|---|---|---|---|---|
| 4,768,256 A | * | 9/1988 | Motoda | 15/250.001 |
| 4,929,072 A | * | 5/1990 | Fujie et al. | 359/507 |
| 5,025,187 A | * | 6/1991 | Fujie et al. | 310/321 |
| 5,037,189 A | * | 8/1991 | Fujie et al. | 359/507 |
| 5,132,840 A | * | 7/1992 | Okada et al. | 359/512 |
| 5,136,425 A | * | 8/1992 | Fujie et al. | 359/507 |
| 5,299,060 A | * | 3/1994 | Mori et al. | 359/514 |
| 7,459,831 B2 | * | 12/2008 | Ludwiczak | 310/321 |

FOREIGN PATENT DOCUMENTS
JP    2003-333395 A    11/2003

* cited by examiner

*Primary Examiner* — Mark Budd
(74) *Attorney, Agent, or Firm* — Canon U.S.A., Inc. IP Division

(57) ABSTRACT

An optical apparatus includes a vibrated member and a piezoelectric element. The piezoelectric element vibrates the vibrated member at a predetermined vibration mode to remove a foreign substance adhered to a surface of the vibrated member. A drive electrode, a first vibration detection electrode and a second vibration detection electrode are provided on a first face of the piezoelectric element, and a ground electrode is provided on a second face of the piezoelectric element. The first vibration detection electrode and the second vibration detection electrode have an axis-symmetrical shape, and are arranged on the first face of piezoelectric element so as to be symmetrical with respect to an axis along which a predetermined vibration node occurs when the vibrated member vibrates at the predetermined vibration mode.

6 Claims, 17 Drawing Sheets

FIG.6A
WHEN m IS AN ODD NUMBER (m=9)
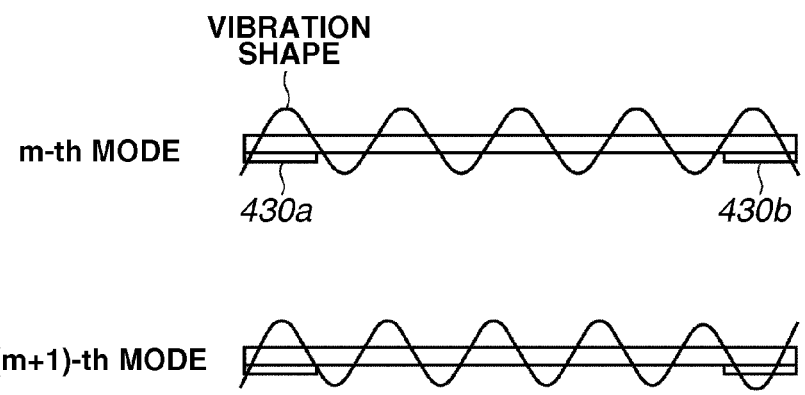
FIG.6B
| | | APPLIED VOLTAGE TO PIEZO ELEMENT 430a | | APPLIED VOLTAGE TO PIEZO ELEMENT 430b | |
|---|---|---|---|---|---|
| | | REAL NUMBER COMPONENT | IMAGINARY NUMBER COMPONENT | REAL NUMBER COMPONENT | IMAGINARY NUMBER COMPONENT |
| (1) | m-th | 1 | 0 | 1 | 0 |
| (2) | (m+1)-th | A | 0 | -A | 0 |
| (3) | WHEN (m+1)-th TIME PHASE SHIFTED BY 90° | 0 | A | 0 | -A |
| (4) | COMBINATION OF (1) AND (3) | 1 | A | 1 | -A |

WHEN m IS AN EVEN NUMBER (m=10)

VIBRATION SHAPE m-th MODE (m+1)-th MODE

| | | APPLIED VOLTAGE TO PIEZO ELEMENT 430a | | APPLIED VOLTAGE TO PIEZO ELEMENT 430b | |
|---|---|---|---|---|---|
| | | REAL NUMBER COMPONENT | IMAGINARY NUMBER COMPONENT | REAL NUMBER COMPONENT | IMAGINARY NUMBER COMPONENT |
| (1) | m-th | 1 | 0 | -1 | 0 |
| (2) | (m+1)-th | A | 0 | A | 0 |
| (3) | WHEN (m+1)-th TIME PHASE SHIFTED BY 90° | 0 | A | 0 | A |
| (4) | COMBINATION OF (1) AND (3) | 1 | A | -1 | A |

EFFECTIVE LUMINOUS FLUX

EFFECTIVE LUMINOUS FLUX

OPTICAL APPARATUS

BACKGROUND OF THE INVENTION

1. Field of the Invention

The present invention relates to an optical apparatus, such as an imaging apparatus, capable of vibrating an optical member arranged on an optical axis to remove a foreign substance, such as dust, adhered to a surface of the optical member.

2. Description of the Related Art

An imaging apparatus, such as a digital camera, converts a captured object image into an electric signal. In such an imaging apparatus, an imaging light flux is received by an image sensor. A photoelectric conversion signal output from the image sensor is converted into image data, and the image data is stored in a recording medium such as a memory card. Examples of the image sensor include a charge coupled device (CCD) sensor and a complementary metal oxide semiconductor (CMOS) sensor.

In such an imaging apparatus, an optical low-pass filter or an infrared absorption filter is arranged on an object side of the image sensor. If a foreign substance such as dust adheres to the surfaces of these filters, the adhered portion appears as a dark spot in the captured image. Accordingly, the appearance of the image deteriorates.

In particular, in a digital single-lens reflex camera having an interchangeable lens, mechanical operation parts such as a shutter and a quick-return mirror are arranged near the image sensor. Therefore, foreign substances such as dust, which is produced from these operation parts, may adhere to the surface of the image sensor and the surface of the filter. Further, when the lens is changed, foreign substances such as dust can enter into a camera body from an opening of a lens mount, and adhere to the inside of the camera body.

To avoid this phenomenon, Japanese Patent Application Laid-Open No. 2003-333395 discusses a technique for removing foreign substances such as dust adhering to a surface of an anti-dust filter, which allows an imaging light flux to be transmitted to the object side of the image sensor, by vibrating the anti-dust filter using a piezo element.

During this process, it is preferred to increase the amplitude of the vibrations by vibrating the anti-dust filter at a resonant frequency using the piezo element so that the foreign substances such as dust are efficiently removed. However, since the resonant frequency depends on the external shape, plate thickness, and physical property values of the anti-dust filter, different anti-dust filters have different resonant frequencies due to variation-generating factors such as processing accuracy and manufacturing processes.

The camera discussed in Japanese Patent Application Laid-Open No. 2003-333395 has a piezo element for applying vibrations to a peripheral portion of a circular anti-dust filter (anti-dust optical member), and an electrode to be used to detect a vibration state of the optical member. This electrode is provided on the piezo element separately from an electrode used for a driving operation. The resonant frequency is detected by monitoring the electrode voltage. Using this resonant frequency, the optical member is vibrated so that foreign substances such as dust adhering to the surface of the optical member are removed.

Generally, various vibration modes appear when the frequency for vibrating the anti-dust filter is changed. Further, the position where vibration nodes occur is different for each vibration mode. Since the nodes are locations where the amplitude of vibration is zero, depending on the position where the nodes occur, the ability of the anti-dust filter to remove foreign substances can be hindered. Therefore, at a frequency near a target vibration mode, hindrance of the anti-dust filter's ability to remove foreign substances can frequently occur. Especially, this phenomenon is more pronounced when a rectangular anti-dust filter is vibrated than when a circular anti-dust filter is vibrated.

Therefore, it is important to correctly find the frequency that produces the target vibration mode. More specifically, it is important to find the frequency at which the nodes occur at the target positions.

However, with the above-described configuration in which one electrode for frequency detection is provided, it is difficult to determine whether the frequency is a frequency at which the nodes will occur at the target positions. In other words, it is difficult to correctly grasp the frequency for producing the target vibration mode.

SUMMARY OF THE INVENTION

According to an aspect of the present invention, an optical apparatus includes a vibrated member, a piezoelectric member configured to vibrate the vibrated member at a predetermined vibration mode to remove a foreign substance adhered to a surface of the vibrated member, wherein a drive electrode, a first vibration detection electrode and a second vibration detection electrode are provided on a first face of the piezoelectric member, and a ground electrode is provided on a second face of the piezoelectric member, a drive unit connected to the drive electrode configured to drive the piezoelectric member, a vibration detection unit configured to detect a vibration state of the vibrated member based on a signal from the first vibration detection electrode and the second vibration detection electrode, and a determination unit configured to determine whether the vibrated member is vibrating in the predetermined vibration mode based on the vibration state detected by the vibration detection unit, wherein the first vibration detection electrode and the second vibration detection electrode have an axis-symmetrical shape, and are arranged on the first face so as to be symmetrical with respect to an axis along which a predetermined vibration node occurs when the vibrated member vibrates at the predetermined mode.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 6A and 6B illustrate shapes of m-th and (m+1)-th vibration modes when m is an odd number, and a voltage applied to the piezo element.

DESCRIPTION OF THE EMBODIMENTS

Various exemplary embodiments, features, and aspects of the invention will be described in detail below with reference to the drawings.

Figure 1:
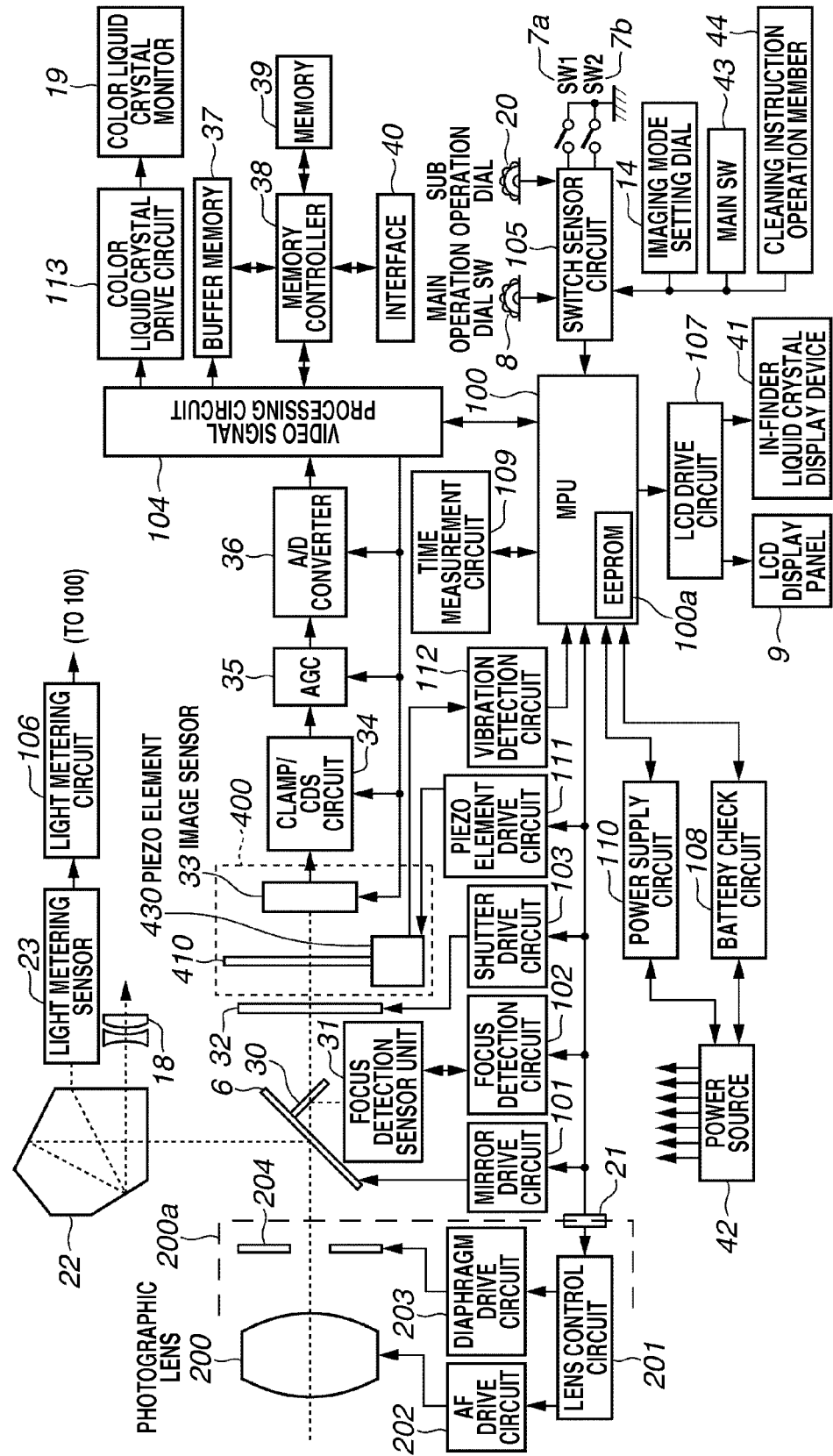
FIG. 1 is a block diagram illustrating an electrical configuration of a single-lens reflex camera according to an exemplary embodiment of the present invention.

FIG. 1 is a block diagram illustrating an electrical configuration of the main parts of an imaging apparatus, specifically a digital single-lens reflex camera, as an optical apparatus according to the present exemplary embodiment. In FIG. 1, a microcomputer (hereinafter, "MPU") 100, which is built-in in a camera body, controls the operations of the camera, and executes various processing and instructions to various elements.

The MPU 100 is connected to a mirror drive circuit 101, a focus detection circuit 102, a shutter drive circuit 103, a video signal processing circuit 104, a switch sensor circuit 105, a light-metering circuit 106, a liquid crystal display (LCD) drive circuit 107, a battery check circuit 108, a time measurement circuit 109, a power supply circuit 110, a piezo element drive circuit 111, and a vibration detection circuit 112. These circuits are operated according to the control from the MPU 100.

The MPU 100 communicates with a lens control circuit 201 in a photographic lens unit 200a via a mount contact 21. The mount contact 21 has a function of sending a signal to the MPU 100 when the photographic lens unit 200a is connected. Consequently, the lens control circuit 201 communicates with the MPU 100 to drive a photographic lens 200 in the photographic lens unit 200a and a diaphragm 204 via an autofocus (AF) drive circuit 202 and a diaphragm drive circuit 203 respectively. In FIG. 1, for convenience, only one photographic lens 200 is illustrated. However, in actual practice, the photographic lens is configured by a plurality of lens groups.

The AF drive circuit 202 includes, for example, a stepping motor. The AF drive circuit 202 changes the focus lens position in the photographic lens 200 based on a control from the lens control circuit 201, so that the focus of the imaging light flux is adjusted to match an image sensor 33.

The diaphragm drive circuit 203 is configured, for example, by an automatic iris. The diaphragm drive circuit 203 changes the diaphragm 204 based on a control from the lens control circuit 201, and obtains an optical diaphragm value.

A main mirror 6 is held at a 45° angle with respect to the imaging optical axis (left-to-right dotted line) illustrated in FIG. 1. In that state, the imaging light flux passing through the photographic lens 200 is guided by the main mirror 6 to a penta-prism 22. Part of the imaging light flux is passed through the main mirror 6, and guided to a sub mirror 30. The sub mirror 30 guides the imaging light flux transmitted through the main mirror 6 to a focus detection sensor unit 31.

The mirror drive circuit 101 includes, for example, a direct current (DC) motor and a gear train. The mirror drive circuit 101 drives the main mirror 6 to a position at which an object image can be observed via a finder, and to a position at which the main mirror 6 is retracted from the imaging light flux. When the main mirror 6 is driven, the sub mirror 30 also moves simultaneously to a position for guiding the imaging light flux to the focus detection sensor unit 31, and to a position at which the main mirror 6 is retracted from the imaging light flux.

The focus detection sensor unit 31 includes, for example, a field lens, a reflection mirror, a secondary image-forming lens, a diaphragm, and a line sensor configured with a plurality of CCDs. These parts are arranged near an image-forming surface (not illustrated). The focus detection sensor unit 31 performs focus detection based on a phase difference AF system. A signal output from the focus detection sensor unit 31 is supplied to the focus detection circuit 102, converted into an object image signal, and then sent to the MPU 100.

The MPU 100 performs a focus detection calculation by a phase difference detection method based on the object image signal. Then, the MPU 100 determines a defocus amount and a defocus direction. Based on the determined defocus amount and defocus direction, the MPU 100 drives the focus lens in the photographic lens 200 to a focus position via the lens control circuit 201 and the AF drive circuit 202.

The penta-prism 22 converts the imaging light flux reflected by the main mirror 6 into a normal upright image, and reflects the converted image. A photographer can observe the object image from a finder eyepiece window via a finder optical system 18. The penta-prism 22 guides part of the imaging light flux to a light-metering sensor 23.

The light-metering circuit 106 obtains an output signal from the light-metering sensor 23, converts the obtained output signal into a luminance signal for each area on the photographic screen, and outputs the produced luminance signals to the MPU 100. The MPU 100 calculates an exposure value based on the luminance signals.

When the photographer is observing the object image via the finder, a leading shutter blade of a shutter unit (mechanical focal plane shutter) 32 is positioned at a light-blocking position, and a trailing shutter blade of the shutter unit 32 is positioned at an exposure position. When imaging, the leading shutter blade travels from the light-blocking position to the exposure position, so that light from the object passes through, and an image capturing is performed by the image sensor 33.

After a desired shutter time has elapsed, the trailing shutter blade travels from the exposure position to the light-blocking position, and image capturing is completed. The mechanical focal plane shutter unit 32 is controlled by the shutter drive circuit 103 that has received a command from the MPU 100.

An imaging unit 400 is formed as a unit with an optical low-pass filter 410, a piezo element 430, the image sensor 33, and other components to be described below. The image sensor 33 is an optical sensing unit for electrically converting an optical image of the target into an electric signal. In the present exemplary embodiment, a CMOS sensor is used as the image sensor 33. However, the present invention may employ various kinds of imaging device, such as a CCD type, a CMOS type, a charge injection device (CID) type and the like.

The optical low-pass filter 410, which is arranged in the front of the image sensor 33, is a single birefringent plate made of quartz. Preferably, the optical low-pass filter 410 has a rectangular shape, but other shapes may also be applicable. The piezo element 430 is a single-sheet piezo element, which is vibrated by a piezo element drive circuit 111 by receiving an instruction from the MPU 100. The vibrations of the piezo element 430 are transmitted to the optical low-pass filter 410.

A clamp/correlated double sampling (CDS) circuit 34 performs basic analog processing before analog/digital (A/D) conversion. The clamp/CDS circuit 34 can also change a clamp level. An automatic gain controller (AGC) 35 performs basic analog processing before analog/digital (A/D) conversion. The AGC 35 can also change an AGC basic level. An A/D converter 36 converts an analog output signal from the image sensor 33 into a digital signal.

A video signal processing circuit 104 uses hardware to execute all image processing on the digitalized image data, such as gamma/knee processing, filter processing, and information synthesizing processing for monitor display. Image data for monitor display from this video signal processing circuit 104 is displayed on a color liquid crystal monitor 19 via a color liquid crystal driving circuit 113. Further, the video signal processing circuit 104 can store the image data in a buffer memory 37 via a memory controller 38 based on an instruction from the MPU 100.

In addition, the video signal processing circuit 104 can perform image data compression processing such as joint photographic experts group (JPEG). When imaging is continuously performed, such as when performing continuous photography, the image data can be temporarily stored in the buffer memory 37, and then pieces of unprocessed image data can be successively read out via the memory controller 38. Consequently, the video signal processing circuit 104 can successively perform image processing and compression processing regardless of the input speed of the image data from the A/D converter 36.

The memory controller 38 has a function of storing image data input from an external interface 40 in a memory 39, and a function of outputting the image data stored in the memory 39 from the external interface 40. As the memory 39, a flash memory, which is removably-mountable on the camera body, for example, may be employed.

The switch sensor circuit 105 sends an input signal to the MPU 100 based on an operating state of each switch. The switch SW1 (7a) is turned on by a first stroke (half press) of a release button. The switch SW2 (7b) is turned on by a second stroke (full press) of the release button. When the switch SW2 (7b) is turned on, an instruction to start imaging is sent to the MPU 100.

The switch sensor circuit 105 is connected to a main operation dial 8, a sub operation dial 20, an imaging mode setting dial 14, a main switch 43, and a cleaning instruction operation member 44. The cleaning instruction operation member 44 is provided for instructing an operation for manually removing a foreign substance, such as dust, adhered to the surface of the optical low-pass filter 410.

The LCD drive circuit 107 drives a LCD display panel 9 and an in-finder LCD device 41 based on an instruction from the MPU 100.

The battery check circuit 108 checks a battery based on an instruction from the MPU 100, and sends the detected result to the MPU 100. A power source 42 supplies electric power to each element in the camera.

The time measurement circuit 109 measures the time and days from when the main switch 43 was turned off until it is next turned on, and based on an instruction from the MPU 100, sends the measurement result to the MPU 100.

Figure 2:
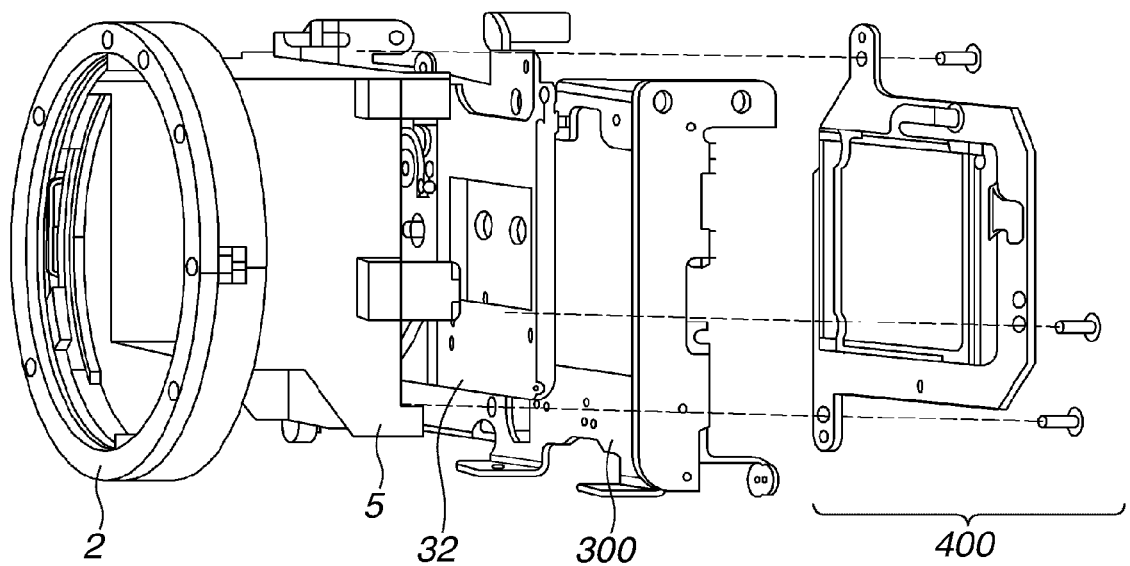
FIG. 2 is an exploded perspective diagram illustrating a schematic configuration of inside a camera to illustrate a support structure of an imaging unit according to an exemplary embodiment.
Figure 3:
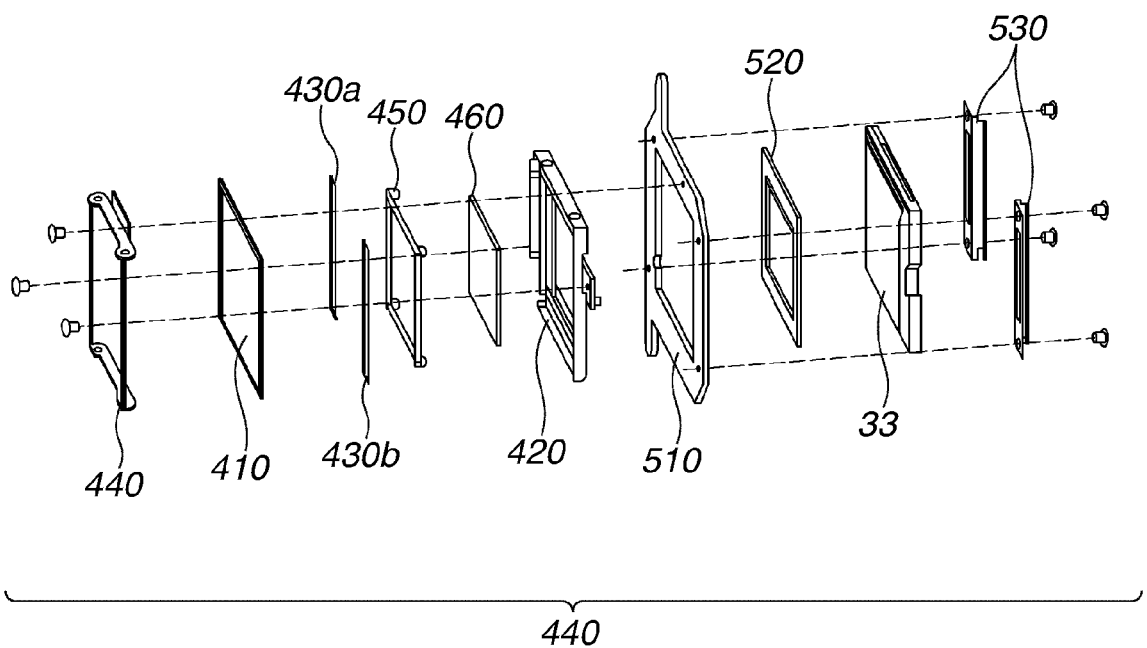
FIG. 3 is an exploded perspective diagram illustrating a configuration of the imaging unit in FIG. 2.

A foreign substance removing structure, which vibrates the optical low-pass filter 410, according to the present exemplary embodiment will now be described. FIG. 2 is an exploded perspective diagram illustrating a schematic configuration of inside a camera to illustrate a support structure of the imaging unit 400 according to the present exemplary embodiment. FIG. 3 is an exploded perspective view schematically illustrating a configuration of the imaging unit 400 in FIG. 2.

In FIG. 2, a mirror box 5 and the shutter unit 32 are arranged in that order on the object side of a body chassis 300. The body chassis 300 acts as a skeleton of the camera body. The imaging unit 400 is arranged on the photographer side of the body chassis 300. The imaging unit 400 is fixed so that an imaging surface of the image sensor 33 is parallel to, and with a predetermined interval therebetween, an attachment surface of a mount portion 2. The mount portion 2 serves as an attachment reference of the imaging lens unit 200a.

In FIG. 3, the optical low-pass filter 410 is a single birefringent plate made of quartz, which has a rectangular shape. The optical low-pass filter 410 is a vibrated member, which forms what is referred to in the present exemplary embodiment as a "plate-shaped rectangular member". This optical low-pass filter 410 corresponds to the optical member arranged on the optical axis in front of the image sensor 33.

The optical low-pass filter 410 has a pair of piezo elements 430a and 430b on either outside portion of an imaging effective region. The optical low-pass filter 410 is symmetrical in a direction orthogonal to the center of the imaging optical axis (a left-right direction of the camera). Optical coating is applied to the surface of the optical low-pass filter 410.

The piezo elements 430a and 430b elastically vibrate mainly in the direction orthogonal to the optical axis due to application of a voltage, which causes the optical low-pass filter 410 to vibrate. The piezo elements 430a and 430b are each adhered (stuck) near to two facing sides of the optical low-pass filter 410. More specifically, each of the piezo elements 430a and 430b has a single-plate, rectangular stripe shape, and is adhesively held at the peripheral portion of the optical low-pass filter 410 so that a long side of the piezo elements 430a and 430b is parallel to a short side (side) of the optical low-pass filter (plate-shaped rectangular member) 410.

More specifically, the piezo elements 430a and 430b are stuck in parallel near to a side in the camera left-right direction of the optical low-pass filter 410. The piezo elements 430a and 430b vibrate the optical low-pass filter 410 in a wave shape so that the optical low-pass filter 410 has a plurality of parallel nodes on the sides. The piezo elements 430a and 430b correspond to what is referred to in the present exemplary embodiment as a "piezoelectric member".

Continuing to refer to FIG. 3, an optical low-pass filter support member 420, which is made from resin or metal, supports the optical low-pass filter 410. The optical low-pass filter support member 420 is attached to an image sensor support member 510.

An urging member 440 urges the optical low-pass filter 410 and a light-blocking mask (not-illustrated) toward the image sensor 33, and is engaged with the optical low-pass filter support member 420. The urging member 440 is earthed to a ground on the camera body. The surface (face applied with the optical coating) of the optical low-pass filter 410 is also earthed to a ground on the camera body. Therefore, adhesion of dust, for example, due to static electricity to the surface of the optical low-pass filter 410 is suppressed.

An elastic member 450 is in close contact with and is supported and sandwiched between the optical low-pass filter 410 and the optical low-pass filter support member 420. The elastic member 450 has a circular, frame-shaped cross-section, and the contact force depends on the urging force of the urging member 440 toward the image sensor 33. The elastic member 450 may be formed of rubber or a high molecular weight polymer such as poron or plastic as long as such material is an elastic body.

An optical member 460 includes a phase plate (depolarization plate), an infrared cut filter, and a birefringent plate having a refraction direction 90° different to that of the optical low-pass filter 410. The optical member 460 is formed by laminating these parts, and is adhered to and fixed on the optical low-pass filter support member 420.

The image sensor support member 510 has a plate-like shape, and includes a rectangular opening. The image sensor 33 is fixed to the image sensor support member 510 so that the image sensor 33 is exposed from the opening. The image sensor support member 510 has on its periphery three arm portions used to attach (e.g., with screws) the image sensor support member 510 to the mirror box 5.

A mask 520 is provided to prevent unnecessary light from outside of the optical path from hitting the image sensor 33. The mask 520 is in close contact with and is supported and sandwiched between the optical low-pass filter support member 420 and the image sensor 33.

A pair of left and right image sensor urging members 530 has a plate spring shape. The image sensor urging members 530 are screwed to the image sensor support member 510, and press the image sensor 33 against the image sensor support member 510.

With the above-described configuration, the optical low-pass filter 410 is sandwiched and supported between the urging member 440 and the elastic member 450 so that it can freely vibrate.

Figure 4:
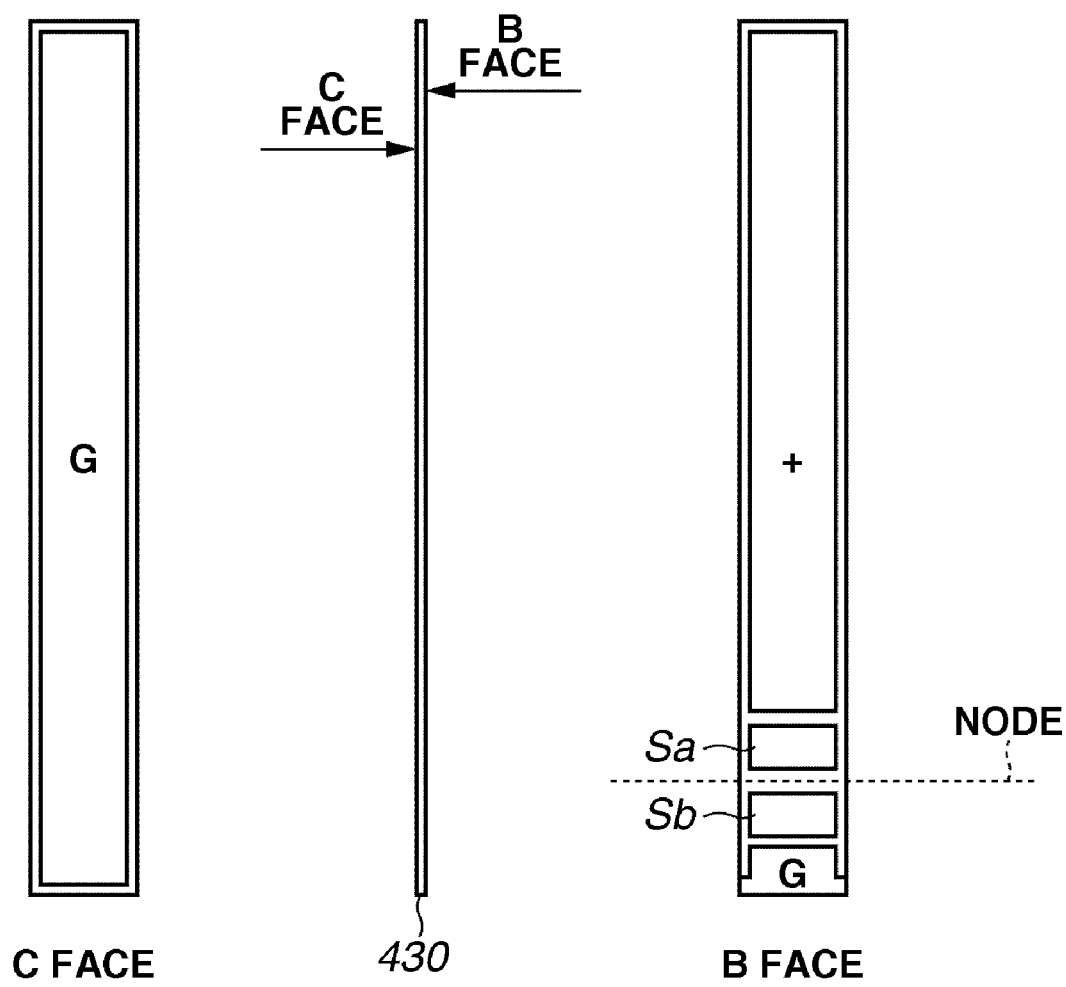
FIG. 4 illustrates in detail a piezo element illustrated in FIG. 3.

FIG. 4 illustrates in detail the piezo elements 430a and 430b illustrated in FIG. 3. As illustrated in FIG. 4, electrodes are arranged on the piezo element 430.

A "B" face of the piezo element 430 (a "first face" as referred to in the present exemplary embodiment) is divided into a + phase for producing vibrations in the optical low-pass filter 410, an Sa phase and an Sb phase for vibration detection, and a G phase. As referred to in the present exemplary embodiment, the + phase, Sa phase, Sb phase, and G phase respectively correspond to a drive electrode, a first vibration detection electrode, a second vibration electrode, and a ground electrode. Further, a "C" face of the piezo element 430 (a "second face" as referred to in the present exemplary embodiment, which is the rear face of the first face) is electrically connected by a conductive member (not illustrated) or the like, and is maintained at the same potential as the G phase of the B face.

A flexible printed board (not illustrated) for a piezo element is fixed to the B face by, for example, adhesion. This flexible printed board for a piezo element is connected to each of the electrodes. The piezo element drive circuit 111, which is a control circuit, is connected to the + phase. The piezo element 430 elastically vibrates due to application of a periodic voltage from the drive circuit 111.

Further, the G phase is connected to a ground. The Sa phase and the Sb phase are each independently connected to the vibration detection circuit 112. The piezo element drive circuit 111 corresponds to what is referred to in the present exemplary embodiment as a "drive unit", and the vibration detection circuit 112 corresponds to what is referred to in the present exemplary embodiment as a "vibration detection unit".

The Sa phase and the Sb phase are vibration detection phases for extracting a polarization charge (piezoelectric effect) produced by the expansion and contraction of the piezo element 430. The Sa phase and the Sb phase have the same shape, and are arranged symmetrically with respect to the vibration nodes, which occur when the optical low-pass filter 410 is vibrated in a target vibration mode as an axis. This point will be described in more detail below.

The "C" face of the piezo element 430 with the thus-arranged electrodes is fixed to the optical low-pass filter 410 by, for example, adhesion. Thus, the piezo element 430 and the optical low-pass filter 410 are configured so as to move integrally. Therefore, the optical low-pass filter 410 can be vibrated by the application of a periodic voltage on the piezo element 430.

Next, referring to FIGS. 5 to 12, the vibration of the optical low-pass filter 410 according to the present exemplary embodiment will be described. In the present exemplary embodiment, a foreign substance such as dust is removed by generating in the optical low-pass filter 410 vibrations, which are capable of transporting the foreign substance. More specifically, the foreign substance is transported by exciting the piezo elements 430a and 430b that are adhered to the optical low-pass filter 410 so that two bending vibrations are produced which are different by one degree with an offset time phase.

In order to narrow down the description to the principles of the transportation operation, a configuration formed with the optical low-pass filter 410 and the piezo elements 430a and 430b, which is the minimum required configuration, will be described.

Figure 5:
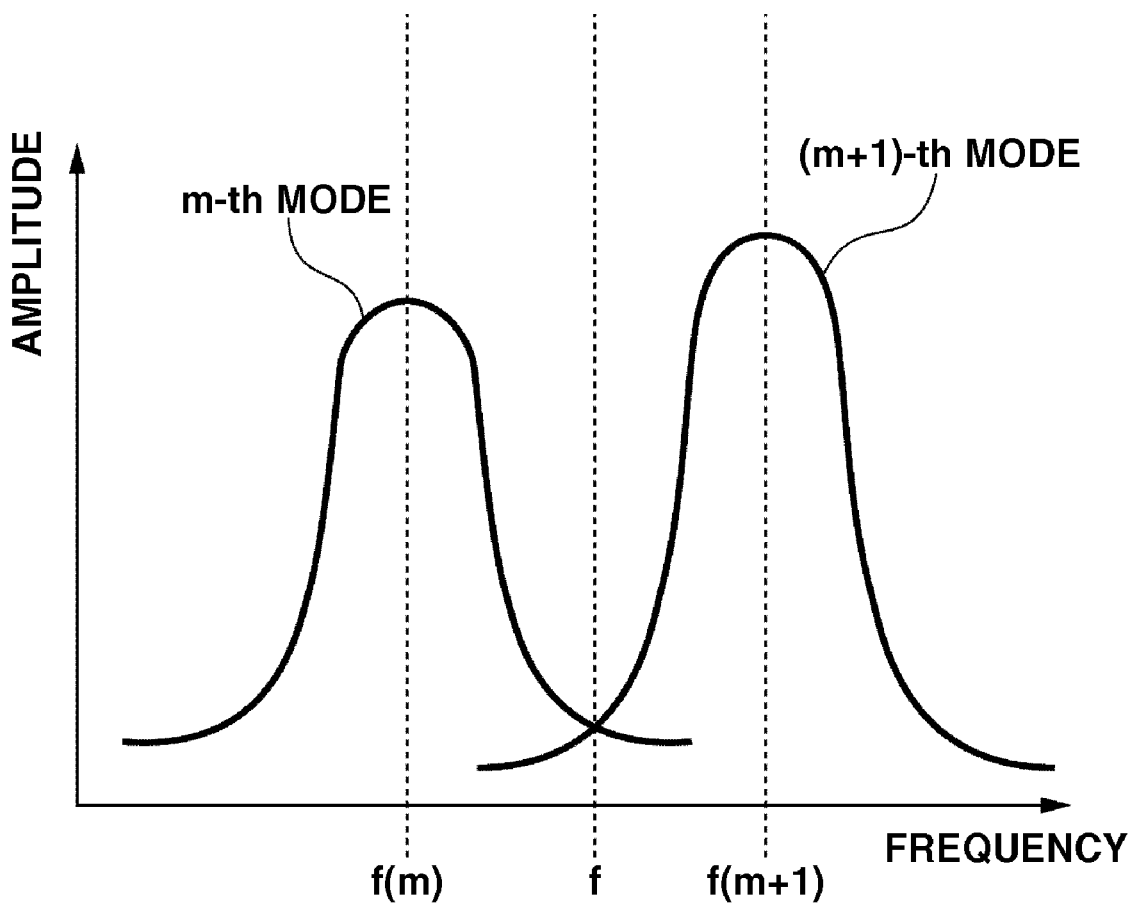
FIG. 5 is a graph illustrating a relationship between frequency and amplitude of two vibration modes produced in an optical low-pass filter according to an exemplary embodiment.

FIG. 5 is a graph illustrating a relationship between frequency and amplitude of two vibration modes produced in the optical low-pass filter 410 according to the present exemplary embodiment. As illustrated in FIG. 5, an m-th vibration mode is produced at a frequency represented by $f(m)$, and an $(m+1)$-th vibration mode is produced at a frequency represented by $f(m+1)$.

If the frequency f of the voltage applied to the piezo elements 430a and 430b is set so that $f(m)<f<f(m+1)$, both the resonances of the m-th mode and the $(m+1)$-th mode can be utilized. If f is set so that f<f(m), although the m-th resonance can be utilized, it is difficult to increase the amplitude of the (m+1)-th mode because the frequency f is separated from the f(m+1)-th resonance point.

Further, if f is set so that f(m+1)<f, the amplitude is increased only for the (m+1)-th mode. In the present exemplary embodiment, to utilize both the vibration modes, the frequency f is set in the range of f(m)<f<f(m+1).

Figures 7A, 7B:
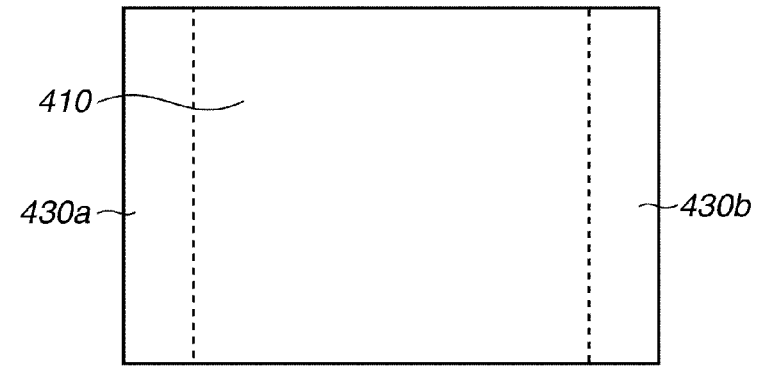
FIGS. 7A and 7B illustrate shapes of m-th and (m+1)-th vibration modes when m is an even number, and a voltage applied to the piezo element.

FIGS. 6A and 6B illustrate the shape of the m-th and (m+1)-th vibration modes when m is an odd number, and a voltage applied to the piezo elements 430a and 430b. FIGS. 7A and 7B illustrate the shape of the m-th and (m+1)-th vibration modes when m is an even number, and a voltage applied to the piezo elements 430a and 430b.

In FIGS. 6A and 6B, a case is illustrated in which m=9 as an example of when m is an odd number. As illustrated in FIG. 6A, for each mode a plurality of nodes appear at equal intervals in a parallel direction (the same direction) in a longitudinal direction of the piezo element 430. In FIG. 6B, for each mode the amplitude of the alternating-current voltage applied to the piezo elements 430a and 430b and the time phases are represented by a real number component and an imaginary number component. (1) represents the alternating-current voltage of the m-th vibration mode, (2) represents the alternating-current voltage of the (m+1)-th vibration mode, and (3) represents the alternating-current voltage when the (m+1)-th vibration mode is offset by a time phase of 90°.

If an amplitude ratio between the m-th vibration mode and the (m+1)-th vibration mode based on an alternating-current voltage with a predetermined frequency is set as A:1, to output the same amplitude for the two modes, the voltage of each mode is standardized as the amplitude of the m-th vibration mode. To simultaneously produce in the optical low-pass filter 410 the m-th vibration mode and the (m+1)-th vibration mode, which has a time phase different by 90°, it is only necessary to add the alternating-current voltages of the above items (1) and (3). In other words, an alternating-current voltage such as that illustrated in item (4) may be applied.

Similarly, FIGS. 7A and 7B illustrate the shape of the vibration modes and the alternating-current voltage applied to the piezo elements 430a and 430b for a case in which m=10 as an example of when m is an even number.

Although the phase difference between the m-th and the (m+1)-th vibration modes is set at 90° in the present exemplary embodiment, the method for combining the two modes can be arbitrarily controlled by controlling the amplitude, phase, and frequency of the alternating-current voltage.

Figure 8:
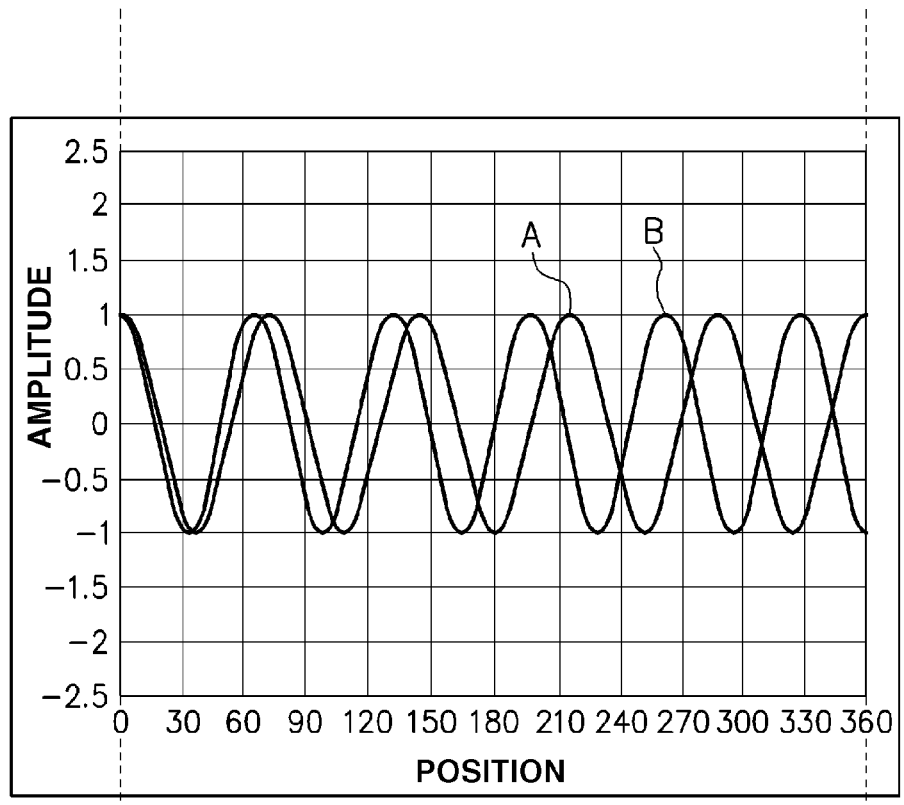
FIG. 8 illustrates a case in which a ninth and a tenth vibration mode are simultaneously produced in an optical low-pass filter according to an exemplary embodiment.
Figure 8:
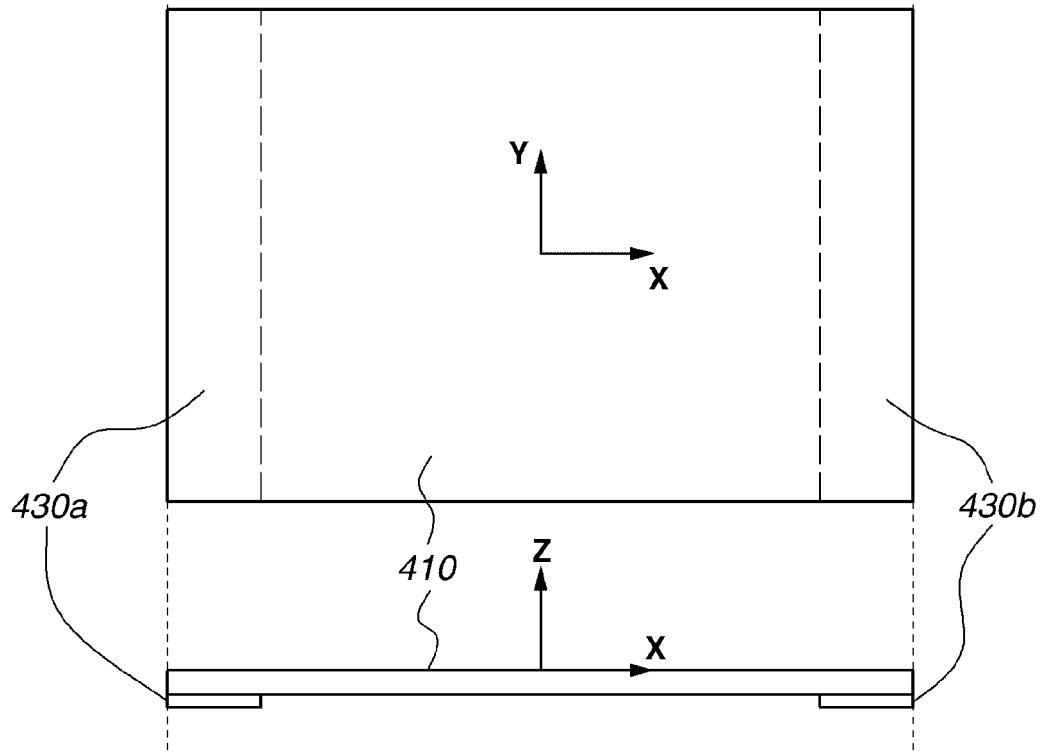

Next, the behavior of the optical low-pass filter 410 when two vibration modes are simultaneously produced based on the above-described control method will be described. As illustrated in FIG. 8, a case will be considered in which the 9-th and the 10-th vibration modes are simultaneously produced in the optical low-pass filter 410.

In FIG. 8, curves A and B respectively represent the shape of the 9-th and 10-th vibration modes. The area from the left edge to the right edge of the optical low-pass filter 410 is represented by a value from 0 to 360°. As illustrated in FIG. 8, the long-side direction of the optical low-pass filter 410 is represented by "X", the short-side direction is represented by "Y", and the normal direction to the face is represented by "Z".

FIGS. 9 to 12 illustrate the behavior at each time phase of the optical low-pass filter 410 when the above-described two modes are simultaneously produced with the time phase offset by 90°.

Figure 9:
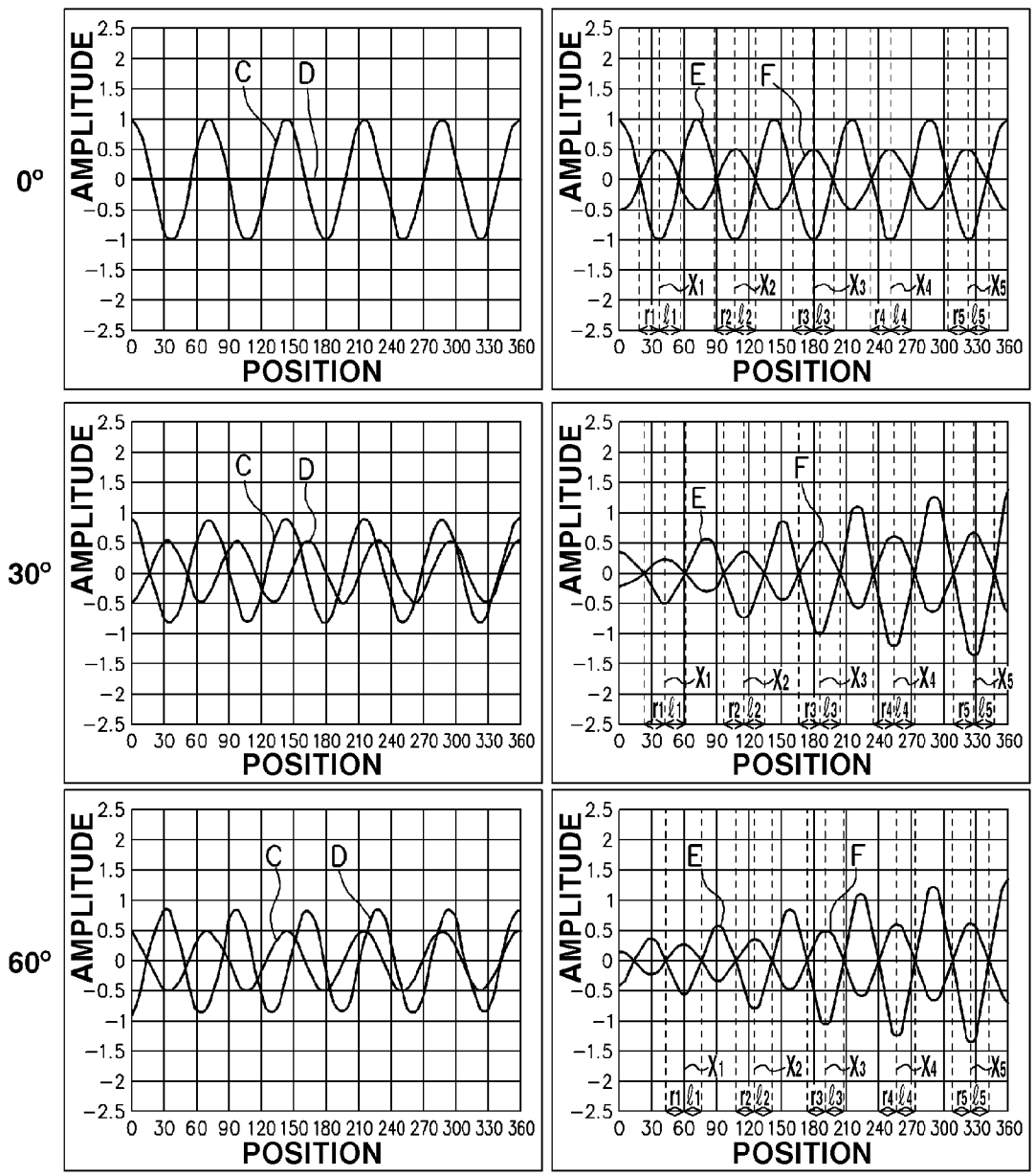
FIG. 9 is a graph illustrating behavior at each time phase for a case in which two vibration modes whose time phase is offset by 90° are simultaneously produced in an optical low-pass filter according to an exemplary embodiment.
Figure 10:
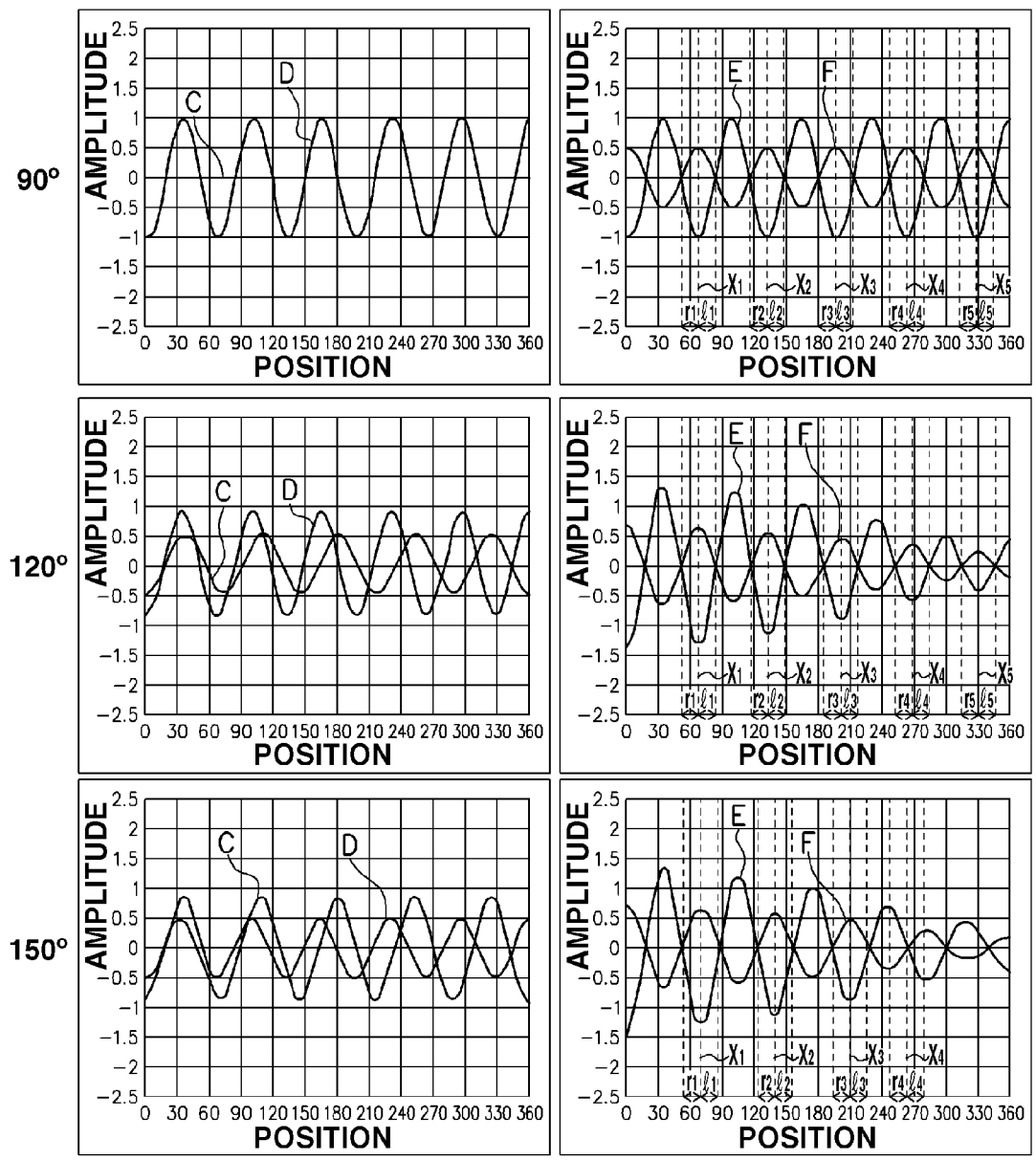
FIG. 10 is a graph illustrating behavior at each time phase for a case in which two vibration modes whose time phase is offset by 90° are simultaneously produced in an optical low-pass filter according to an exemplary embodiment.
Figure 11:
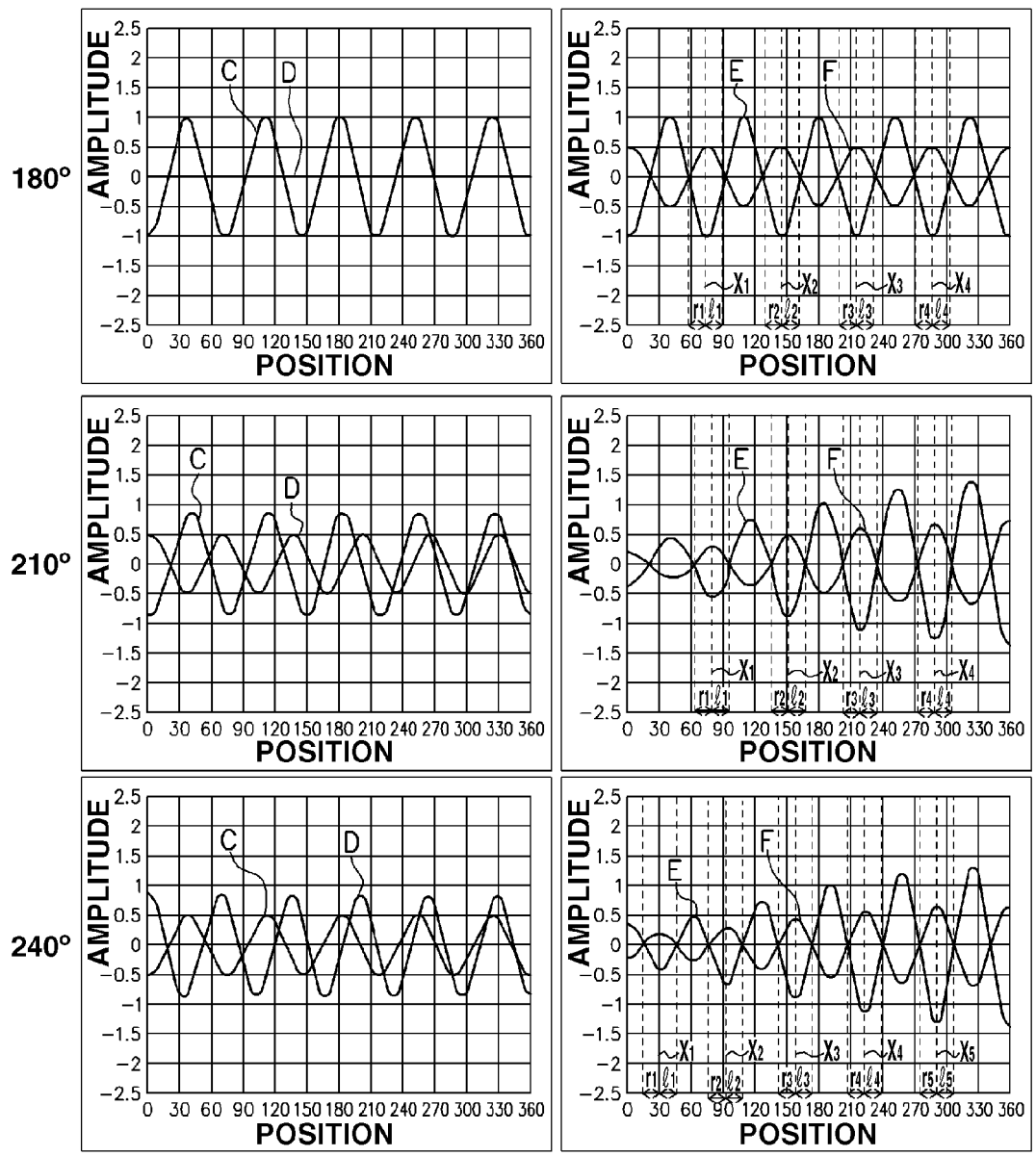
FIG. 11 is a graph illustrating behavior at each time phase for a case in which two vibration modes whose time phase is offset by 90° are simultaneously produced in an optical low-pass filter according to an exemplary embodiment.
Figure 12:
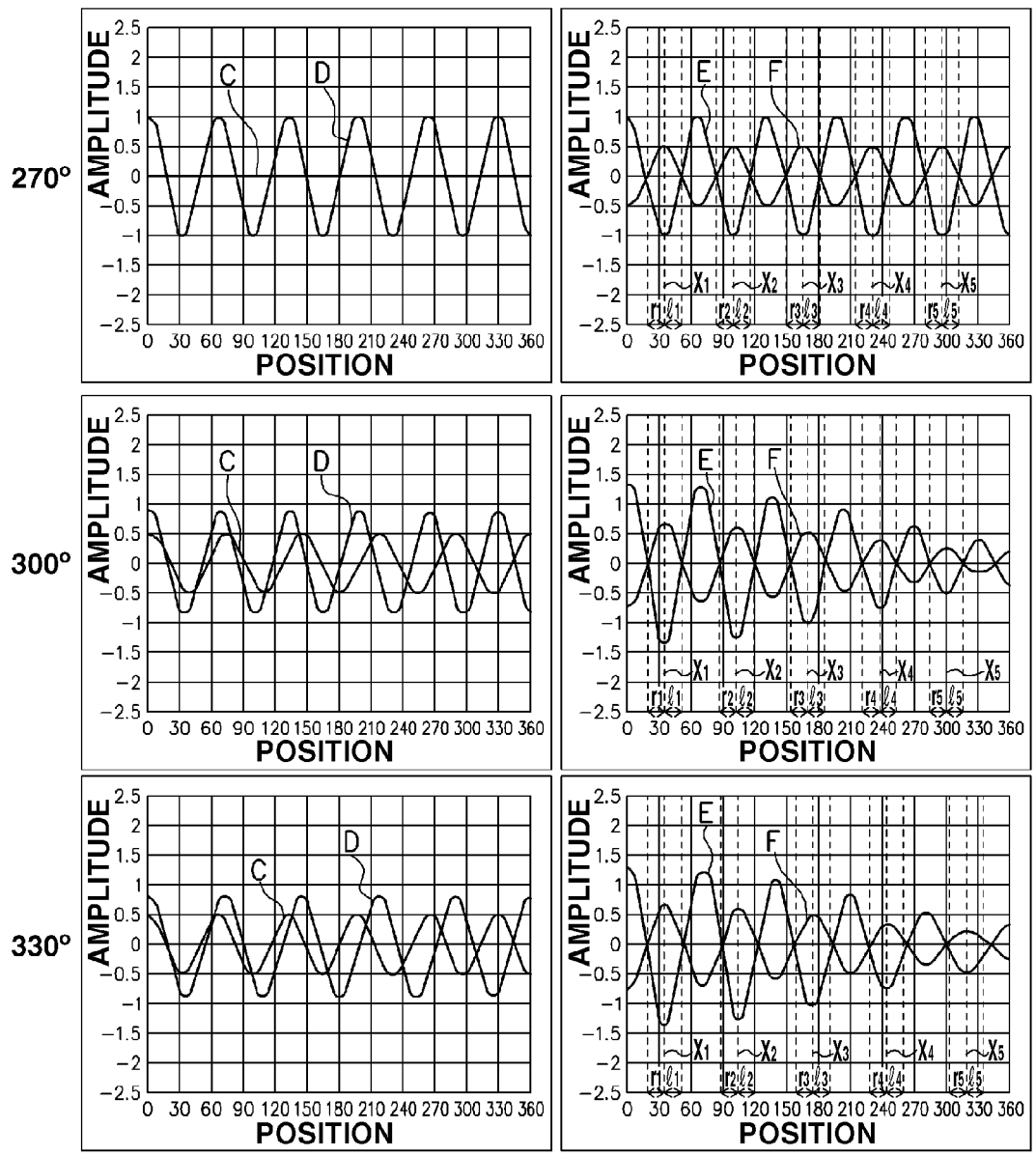
FIG. 12 is a graph illustrating behavior at each time phase for a case in which two vibration modes whose time phase is offset by 90° are simultaneously produced in an optical low-pass filter according to an exemplary embodiment.

In the respective time phases illustrated in FIGS. 9 to 12, a curve C in FIG. 9 represents the shape of the 9-th vibration mode, and a curve D represents the shape of the 10-th vibration mode. Further, a curve E represents the shape when the two modes are superposed. In other words, curve E represents the actual amplitude of the optical low-pass filter 410. In addition, a curve F is the acceleration in the Z direction of the optical low-pass filter 410.

The foreign substance adhered to the surface of the optical low-pass filter 410 is hit and moved by a force in the normal direction due to the optical low-pass filter 410 changing shape. More specifically, when the curve F representing acceleration in the Z direction has a positive value, the foreign substance is lifted up off the face, and hit by a force in the normal direction of a curve E representing the displacement of the optical low-pass filter 410 at that time phase. In the intervals represented by rn (n=1, 2, 3 . . . ) in the drawings, the foreign substance is hit by a force in the right direction (positive sense in the X direction). In the intervals represented by rn (n=1, 2, 3 . . . ) in the drawings, the foreign substance is hit by a force in the left direction (negative sense in the X direction).

Consequently, the foreign substance is moved to a location represented by Xn (n=1, 2, 3 . . . ). In the present exemplary embodiment, the foreign substance moves in a positive sense in the X direction as the Xn (n=1, 2, 3 . . . ) moves in a positive sense in the X direction as the time phases progress.

In the present exemplary embodiment, the time phase difference between the two modes is 90°. However, the present invention is not limited to this. The time phase difference may be set anywhere between 0° and 180°. In such a case too, the location corresponding to the above-described Xn moves in a positive sense in the X direction. Thus, the foreign substance can be moved in a positive sense in the X direction. Further, when the time phase difference between the two modes is from −180° to 0°, the location corresponding to the above-described Xn moves in a negative sense in the X direction. Thus, the foreign substance can be moved in an opposite direction to that in the example described above.

In addition, the transportation force of the foreign substance is determined based on the acceleration of the optical low-pass filter 410. An acceleration "a" of the optical low-pass filter 410 is represented by the following expression, in which f represents the drive frequency, P represents the amplitude, V represents the drive voltage, and k1 and k2 are proportional constants.

$$a = k_1 P (2\pi f)^2 = k_2 V (2\pi f)^2$$

More specifically, the transportation force of the foreign substance is proportional to the amplitude and the square of the drive frequency of the optical low-pass filter 410. Therefore, by increasing the alternating-current voltage V applied to the piezo element 430 and the frequency f, the transportation force can be increased.

As described above, the foreign substance is moved by causing the optical low-pass filter 410 to vibrate at a frequency f that satisfies the inequality f(m)<f<f(m+1). At this stage, the frequency f must be the frequency between f(m) and f(m+1) at which the vibration mode best suited for transporting the foreign substance is produced.

Figure 13A:
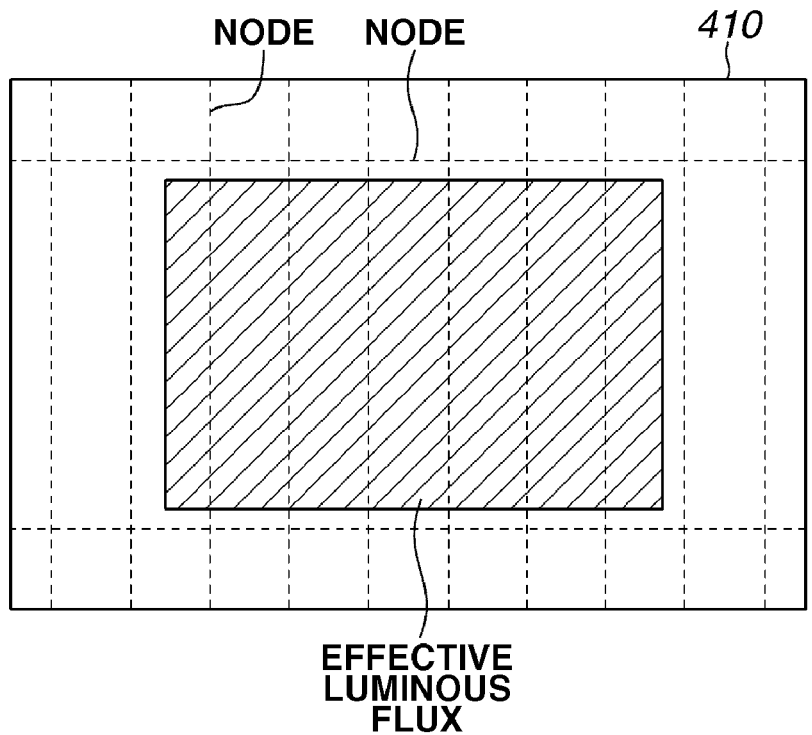
FIGS. 13A and 13B schematically illustrate a vibration mode of an optical low-pass filter according to an exemplary embodiment.
Figure 13B:
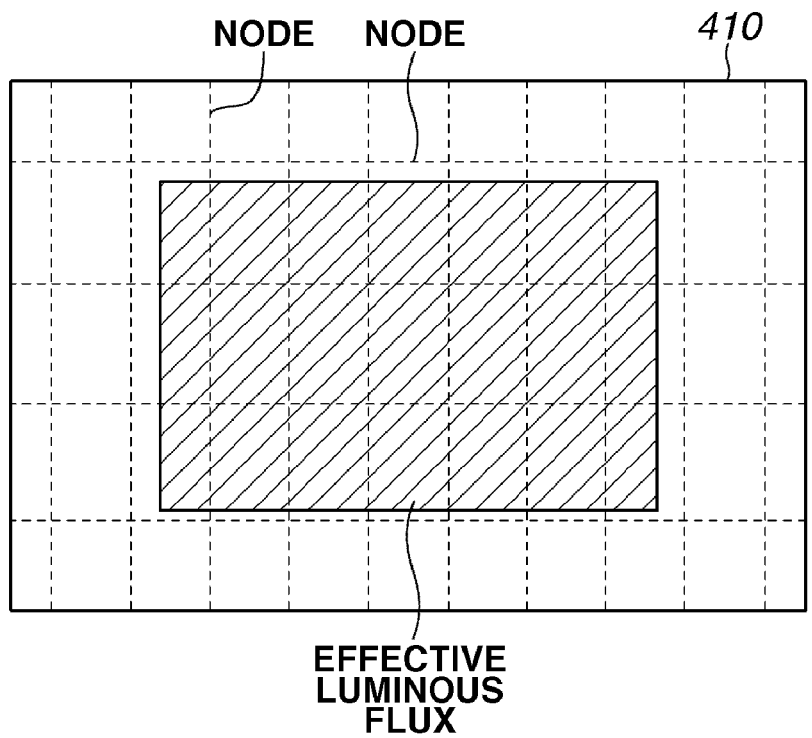

FIGS. 13A and 13B schematically illustrate a vibration mode of the optical low-pass filter 410. FIG. 13A illustrates a vibration mode at the frequency f. FIG. 13B illustrates a vibration mode at a given frequency, which is near the frequency f. In FIGS. 13A and 13B, the dotted lines represent vibration nodes.

The vibration mode of FIG. 13A is the mode at which the transportation ability can be realized to a maximum extent, and is the target vibration mode (predetermined vibration mode). In this mode, nodes occur in a vertical direction (the direction parallel to the short side of the optical low-pass filter 410, in other words, the direction orthogonal to the transportation direction of the foreign substance) (m-th vibration mode (in FIG. 13A, m=10)).

In addition, one node also occurs above and below an effective luminous flux in a horizontal direction (the direction parallel to the long side of the optical low-pass filter 410, in other words, the direction parallel to the transportation direction of the foreign substance). Although the nodes in the horizontal direction hinder the transportation of the foreign substance, these nodes are positioned out of the effective luminous flux (imaging area) from which the foreign substance should be removed. Therefore, the foreign substance removal ability inside the effective luminous flux is ensured.

On the other hand, FIG. 13B illustrates a vibration mode in which, in addition to the nodes of FIG. 13A, two more nodes occur in the effective luminous flux in the horizontal direction. This vibration mode exists near the frequency f. The presence of nodes in the effective luminous flux in the horizontal direction may hinder the ability to transport the foreign substance. Further, as the number of nodes in the horizontal direction increases, the amplitude in the vertical direction decreases. Consequently, there is a further drop in the transportation ability.

In the present exemplary embodiment, the vibration mode illustrated in FIG. 13B was described as an example. However, various other vibration modes exist near the frequency f. Many of those vibration modes include a large number of nodes in the horizontal direction. If such a vibration mode is used, the transportation ability is greatly harmed.

Therefore, it is important that the vibration mode becomes as illustrated in FIG. 13A. In other words, correctly detecting the frequency f at which there is one node each in the horizontal direction above and below the effective luminous flux, and using that frequency f, are very important in generating the vibrations for transporting the foreign substance.

Figure 14:
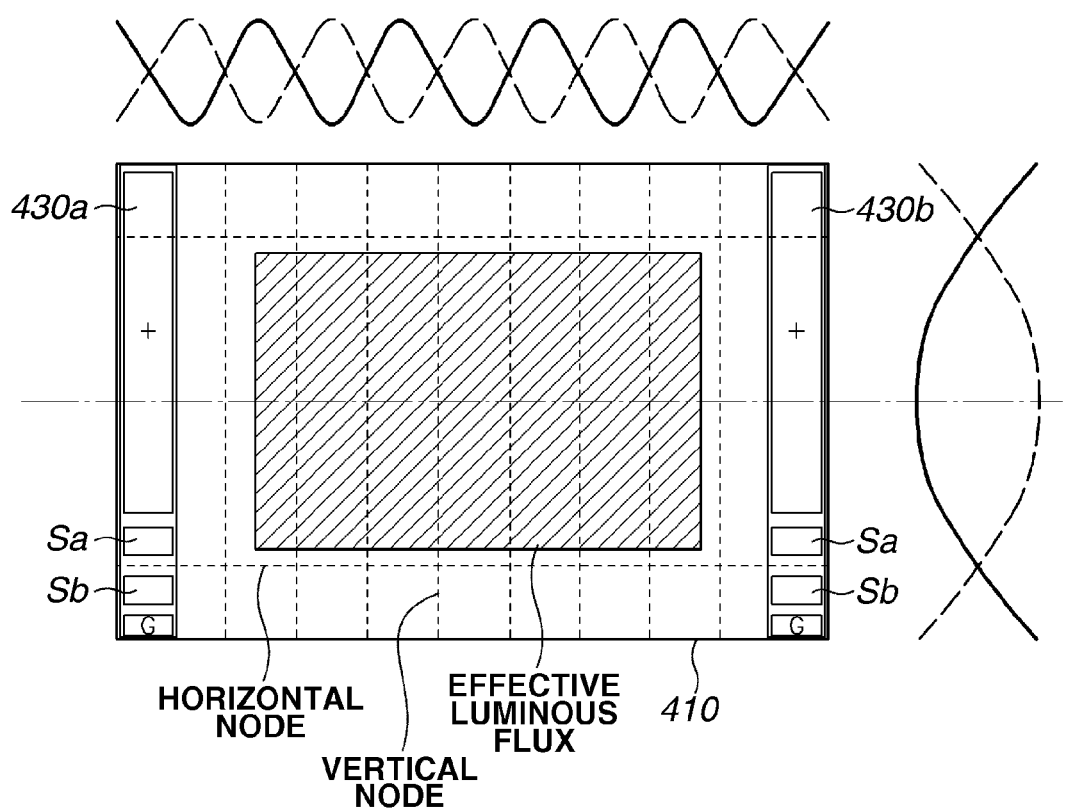
FIG. 14 illustrates a vibration mode of an optical low-pass filter according to an exemplary embodiment along with a piezo element.

A method for detecting the frequency f will now be described with reference to FIG. 14 and FIGS. 15A, 15B, and 15C. FIG. 14 illustrates a vibration mode at the frequency f with a configuration formed with the optical low-pass filter 410 and the piezo elements 430a and 430b. In FIG. 14, the dotted lines represent vibration nodes. The nodes in the vertical direction are based on an m-th vibration mode (in FIG. 14, m=9); and the nodes in the horizontal direction are based on a first (m=1) vibration mode.

As illustrated in FIG. 14, one node in the vertical direction occurs both above and below symmetrically with respect to a center axis (center axis parallel to the transportation direction of the foreign substance) of the optical low-pass filter 410. The same-shaped vibration detection electrodes Sa and Sb are arranged on the piezo elements 430a and 430b symmetrically with respect to the "bottom-side" horizontal direction node.

The output voltages of the vibration detection electrodes Sa and Sb are the same at the piezo element 430a or the piezo element 430b. Therefore, the vibration detection electrodes Sa and Sb may be arranged on either one of the piezo element 430a or 430b. Further, the vibration detection electrodes Sa and Sb can be arranged symmetrically with respect to the "top-side" horizontal direction node, rather than the "bottom-side".

The vibration detection electrodes Sa and Sb can be arranged on only the "top-side" or only the "bottom-side" of the center axis of the optical low-pass filter 410. The reason for this is that because the horizontal nodes are symmetrical with respect to the center axis, the relationship between the waveforms output by the vibration detection electrodes Sa and Sb are the same for the "top-side" and the "bottom-side". Therefore, only the "top-side" or the "bottom-side" needs to be detected.

Moreover, if the vibration detection electrodes are arranged on both the "top-side" and the "bottom-side", the + phase area, which is the drive phase, decreases, so that the ability to vibrate the optical low-pass filter 410 itself is harmed.

Figure 15A:
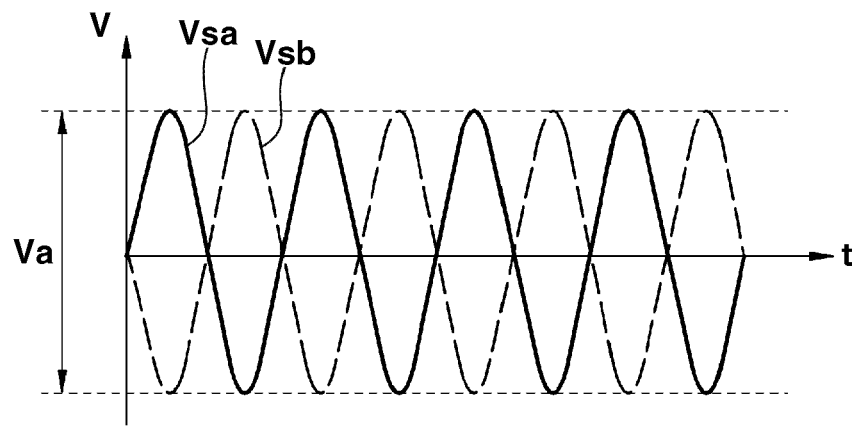
FIGS. 15A, 15B, and 15C are graphs each illustrating an output voltage waveform of vibration detection electrodes Sa and Sb of a piezo element according to an exemplary embodiment.
Figure 15B:
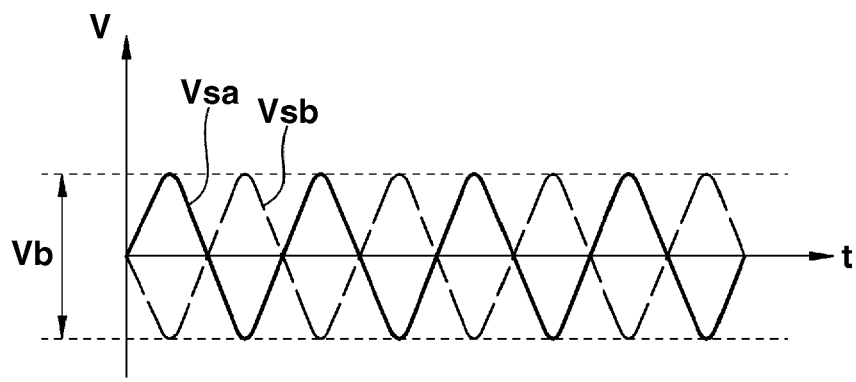
Figure 15C:
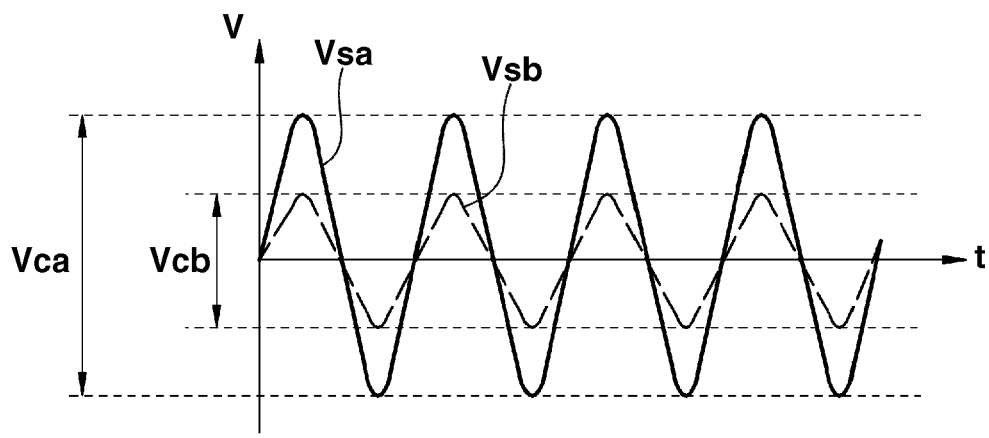

FIGS. 15A, 15B, and 15C are graphs illustrating an output voltage waveform of the vibration detection electrodes Sa and Sb arranged as described above. A sinusoidal wave voltage is generated in the vibration detection electrodes Sa and Sb due to a piezoelectric effect that occurs with the vibrations of the piezo element 430. At this point, the electrode G is constantly kept grounded (i.e., at 0 volts [V]). The sinusoidal waveforms illustrated in FIGS. 15A to 15C are obtained by the vibration detection circuit 112.

The difference in potential detected at this stage is proportional to the vibration amplitude of the piezo element 430, and by extension, the optical low-pass filter 410. Therefore, by monitoring the output voltage waveform, the vibration state of the piezo element 430, and by extension, the vibration state of the optical low-pass filter 410, can be detected.

FIG. 15A illustrates the output during the vibration mode at the frequency f. Output voltage values Vsa and Vsb at the vibration detection electrodes Sa and Sb are both the same (Va), and in opposite phases (phases are 180° different). This utilizes the fact that the elasticity of the piezo element 430 has a 180° different phase with the vibration nodes as a boundary. In other words, the fact that an output like that in FIG. 15A can be obtained means that, when the vibration detection electrodes Sa and Sb have an axis-symmetrical shape, horizontal nodes occur on that axis of symmetry.

On the other hand, FIGS. 15B and 15C illustrate the output voltage during the vibration mode at a frequency near the frequency f. FIG. 15B illustrates the output voltage during a vibration mode like that illustrated in FIG. 13B.

Output voltage values Vsa and Vsb of the vibration detection electrodes Sa and Sb are both the same (Vb), and in opposite phases (phases are 180° different). However, compared with those voltage values in FIG. 15A, Vb<Va. This is because, as illustrated in FIG. 13B, there are horizontal nodes on the axis of symmetry of the vibration detection electrodes Sa and Sb. In addition, if a horizontal node also occurs at a location other than on that axis of symmetry, the elastic amount of the piezo element 430 decreases, which results in output voltage decreasing. Therefore, Vb<Va.

FIG. 15C illustrates the output voltage during a vibration mode in which there are no horizontal nodes on the axis of symmetry of the vibration detection electrodes Sa and Sb, and the vibration detection electrodes Sa and Sb are both on the same side with respect to the horizontal nodes. The output voltage value Vsa of the vibration detection electrode Sa is Vca, and the output voltage value Vsb of the vibration detection electrode Sb is Vcb. Both of the output voltage waveforms are the same phase.

Based on the above, it can be seen that when the piezo element 430 is driven at a predetermined frequency, and the output waveform of FIG. 15B or 15C, which is different from the output waveform of FIG. 15A, is detected, at that frequency nodes do not occur at the target position. In other words, it can be seen that the vibration mode is not the target vibration mode. Therefore, based on the output voltage waveforms of the vibration detection electrodes Sa and Sb, the frequency at which the maximum ability to transport the foreign substance can be exerted may be correctly specified.

Figure 16:
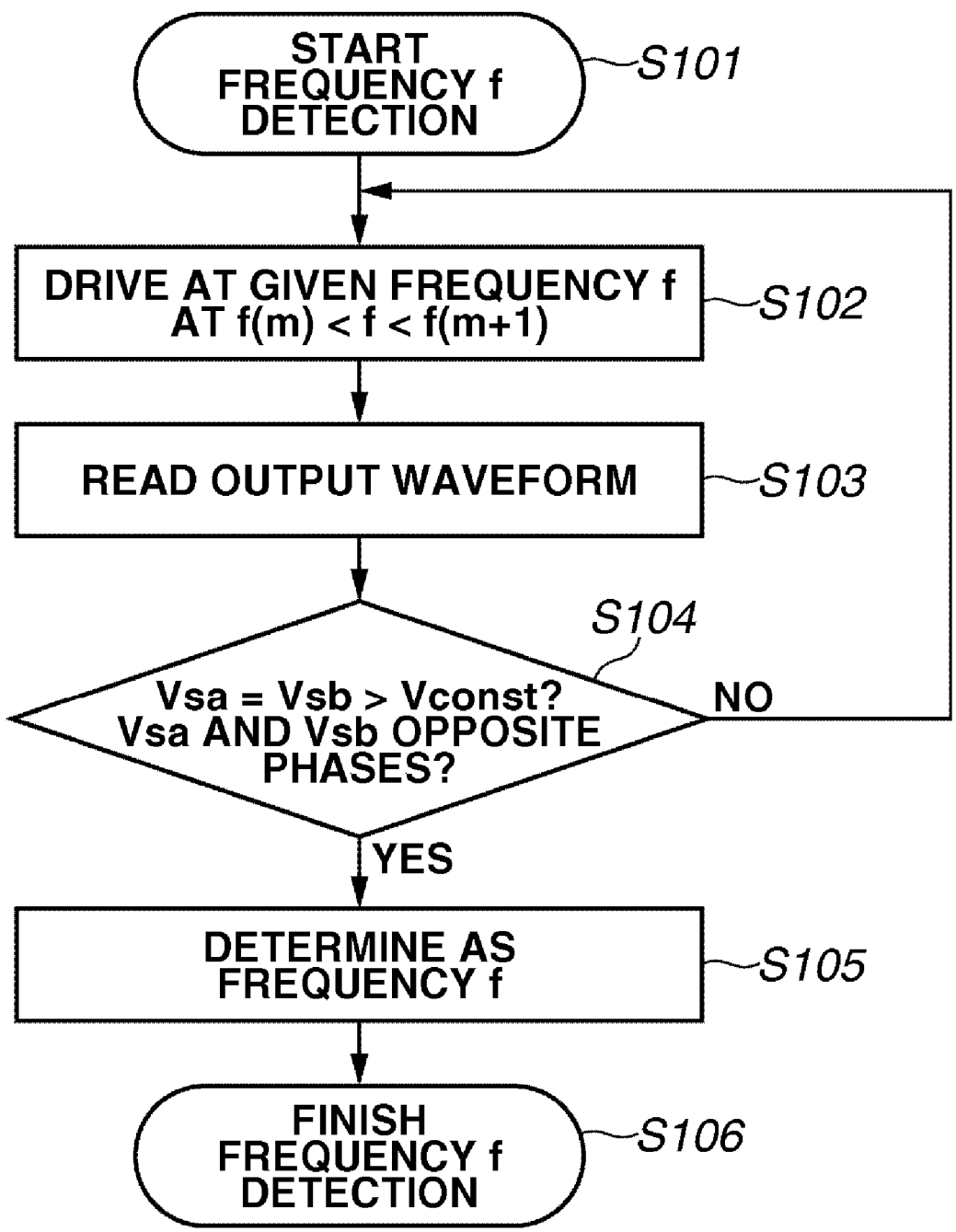
FIG. 16 is a flowchart illustrating an operation for determining a frequency for generating a transportation vibration on an optical low-pass filter according to an exemplary embodiment.

Next, in FIG. 16, an operation for determining the frequency f for generating transportation vibrations will be illustrated. In step S101, detection of the frequency f is started in response to an instruction from the MPU 100.

In step S102, the piezo element 430 is vibrated at a predetermined frequency f, which is f(m)<f<f(m+1), by the piezo element drive circuit 111. In step S103, the output voltage waveforms of the vibration detection electrodes Sa and Sb at that time are read by the vibration detection circuit 112.

Then, in step S104, the MPU 100 determines whether the output voltage values Vsa and Vsb of the vibration detection electrodes Sa and Sb are both the same (same magnitude), whether these output voltage values Vsa and Vsb are equal to or greater than a predetermined value Vconst, and further whether both the output voltage values Vsa and Vsb are opposite phases (phases which are 180° different). This MPU 100 corresponds to what is referred to in the present invention as a "determination unit". The predetermined value Vconst is a value determined by multiplying the output Va of FIG. 15A by a coefficient.

If it is determined in step S104 that the conditions are not satisfied (NO in step S104), the MPU 100 determines that horizontal nodes do not occur at the target position, specifically, that the vibration mode is not the target vibration mode. Then, the frequency f is changed to a different value, and the processing of steps S101 to S104 is repeated. More specifically, the processing of steps S101 to S104 is repeated while progressively changing the frequency f until the conditions are satisfied.

When it is determined in step S104 that the conditions are satisfied (YES in step S104), in step S105, the frequency f is determined to be the frequency f for generating transportation vibrations. The processing then proceeds to step S106, and detection of the frequency f is finished.

In addition to performing this frequency f detection operation during the mass production stage in the factory, the detection operation can also be performed while the camera is being used by the user. This is because the frequency f value suited to the transportation of the foreign substance changes depending on the usage environment of the camera (e.g., the usage temperature or changes over time due to prolonged use of the piezo element). The foreign substance transportation ability can be exerted to the maximum extent for a usage environment by determining the optimal frequency f each time the user performs a cleaning operation to remove foreign substances, and using that frequency f.

Further, this frequency f detection operation can also be utilized for failure detection or abnormality detection. During the above-described frequency detection operation, when the detected amplitude is considerably smaller than the assumed amplitude or when the vibration detection waveform is abnormal, it can be considered that the foreign substance removing unit has an abnormality. Therefore, measures against the abnormality, such as stopping the operation of the foreign substance removing unit and changing the foreign substance removing unit may be taken.

Figure 17:
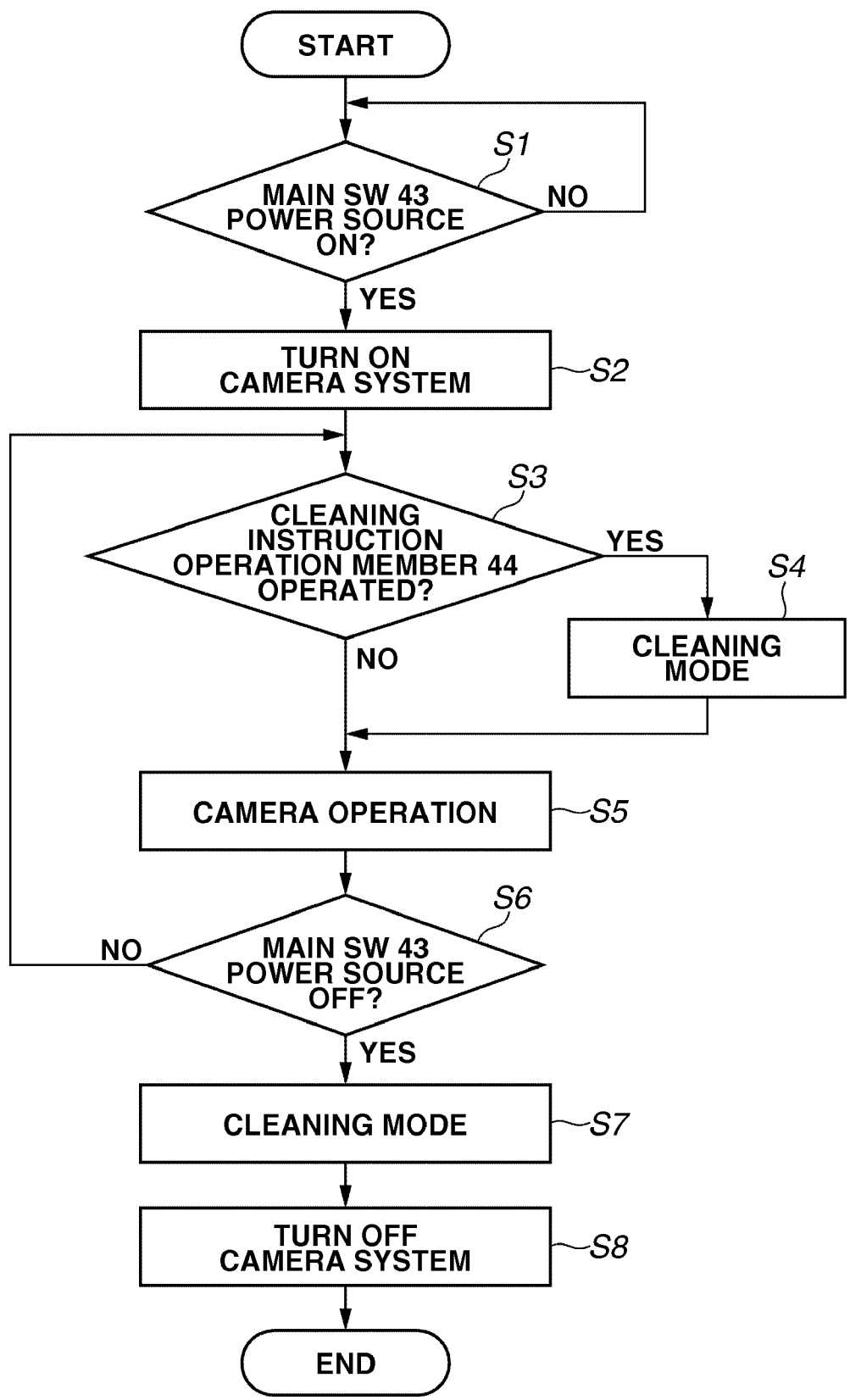
FIG. 17 is a flowchart illustrating an operation to remove a foreign substance, such as dust, adhered to a surface of an optical low-pass filter according to an exemplary embodiment.

Next, referring to FIG. 17, an operation for removing a foreign substance such as dust adhered to the surface of the optical low-pass filter 410 will be described. In step S1, it is determined whether the power source is turned on by the main switch 43. If it is determined, in step S1, that the power source is ON (YES in step S1), in step S2, processing for starting up the camera system is performed. More specifically, an operation to turn on the camera system to enable a photographing operation as a camera is performed by controlling the power supply circuit 110 so as to supply power to the various circuits, so that the system undergoes initial set up.

Next, in step S3, it is determined whether the cleaning instruction operation member 44 is operated by the photographer. If it is determined that the cleaning instruction operation member 44 is operated (YES in step S3), the processing proceeds to step S4. If it is determined that the cleaning instruction operation member 44 is not operated (NO in step S3), the processing proceeds to step S5.

Although a cleaning instruction operation member 44 is provided in the present exemplary embodiment, the present invention is not limited to this. For example, the operation member for instructing the processing to proceed to a cleaning mode is not limited to a mechanical button. This instruction may be executed using a cursor key, an instruction button, and the like via a menu displayed on the color liquid crystal monitor 19.

In step S4, a command to start the cleaning mode is received, and the camera body proceeds to a cleaning mode state. First, the power supply circuit 110 supplies the power required for cleaning to the various units of the camera body. Further, in parallel with this, the power supply circuit 110 detects the remaining battery level of the power source 42, and sends that result to the MPU 100.

When the MPU 100 receives a signal to start the cleaning mode, the MPU 100 determines the frequency f by executing a mode to detect the frequency f for generating transportation vibrations (refer to FIG. 16). Then, the piezo element drive circuit 111 receives an instruction from the MPU 100, and generates a periodic voltage having the determined frequency f. Consequently, the piezo elements 430a and 430 are excited, and they generate two bending curves different by one degree with an offset time phase.

Accordingly, transportation waves are generated in the optical low-pass filter 410, and the foreign substance is removed by transportation. When the cleaning mode finishes, the processing proceeds to step S5.

In step S5, a camera operation is performed by receiving a signal from the switch SW1 (7a), the switch SW2 (7b), the main operation dial 8, the sub operation dial 20, the imaging mode setting dial 14, and some other switches. The camera operation is performed in a mode using commonly known camera imaging and setting. A specific description of such an operation is omitted here.

Next, in step S6, it is determined whether the power source is turned off by the main switch 43 with the camera in a standby state. If it is determined that the power source is OFF (YES in step S6), the processing proceeds to step S7. If it is determined that the power source is not OFF (NO in step S6), the processing returns to step S3.

In step S7, a similar cleaning mode as in step S4 is executed, and the processing then proceeds to step S8. In the cleaning mode performed in step S7, parameters such as the piezo element 430 drive frequency, drive time, and control method can obviously be changed from those in step S4 in consideration of power consumption, operation time and the like.

In step S8, the respective circuits are shut down according to a control from the MPU 100, necessary information and the like is stored in an electrically erasable programmable read-only memory (EEROM) 100a, and an operation to turn the power source off is performed, in which the power supply circuit 110 is controlled so as to cut off the power source supply to the respective circuits. Thus, the cleaning mode is executed not only at an arbitrary timing intended by the photographer, but also when the power source is turned off. More specifically, the camera system is turned off after an operation to remove foreign substances adhered to the surface of the optical low-pass filter 410 is performed.

Various types of foreign substance adhere to the surface of the optical low-pass filter 410. It has been experimentally proved that, in general, if the foreign substances are left on the optical low-pass filter 410 for a long period of time, it is difficult to remove the foreign substances even if vibration is applied in a cleaning mode.

This may occur because an adhesion force, such as a liquid bridge force, increases due to dew condensation caused by environmental change (in the temperature or humidity). Alternatively, this may occur because of dust firmly adhering after repeatedly swelling and drying due to environmental change. In addition, when rubber is employed as an elastic material, for example, oil included in the rubber bleeds and adheres over time.

Therefore, a cleaning mode executed after the power OFF operation is more efficient and more effective than a cleaning mode executed after the power ON operation, which is performed in a state in which there is a high chance that the foreign substance is difficult to remove due to the camera not having been used for a long period of time.

As described above, in the present exemplary embodiment, during transportation vibration of the optical low-pass filter 410, the frequency for producing the target vibration mode most suited to transportation can be correctly detected. Therefore, by using that frequency, foreign substances on the optical low-pass filter 410 can be efficiently transported and removed.

The optical member described in the present invention is not limited to the optical low-pass filter 410. The optical member described in the present invention may be a cover glass of the image sensor 33. In the above-described exemplary embodiment, a configuration has been described in which vibrations are produced in a quartz birefringent plate. However, lithium niobate may be used as the birefringent plate material instead of quartz. Alternatively, the vibrations may be produced in an optical low-pass filter configured by laminating a birefringent plate, a phase plate, and an infrared absorbing filter, or only in an infrared absorbing filter. Moreover, the vibrations may be produced in a glass plate arranged separately in front of a birefringent plate.

Although an example has been described in the present exemplary embodiment in which the present invention is applied in a digital camera, the present invention is not limited to this. For example, the present invention can be applied to optical apparatuses such as a liquid crystal projector. Even in an optical apparatus such as a liquid crystal projector, when a foreign substance such as dust is adhered to the surface of an optical member in a projection optical system, a shadow of the foreign substance is projected. Accordingly, a similar configuration as that of the present exemplary embodiment may be employed.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-074859 filed Mar. 25, 2009, which is hereby incorporated by reference herein in its entirety.

What is claimed is:

1. An optical apparatus comprising:
   a vibrated member;
   a piezoelectric member configured to vibrate the vibrated member at a predetermined vibration mode to remove a foreign substance adhered to a surface of the vibrated member, wherein a drive electrode, a first vibration detection electrode and a second vibration detection electrode are provided on a first face of the piezoelectric member, and a ground electrode is provided on a second face of the piezoelectric member;
   a drive unit connected to the drive electrode configured to drive the piezoelectric member;
   a vibration detection unit configured to detect a vibration state of the vibrated member based on a signal from the first vibration detection electrode and the second vibration detection electrode; and
   a determination unit configured to determine whether the vibrated member is vibrating in the predetermined vibration mode based on the vibration state detected by the vibration detection unit,
   wherein the first vibration detection electrode and the second vibration detection electrode have an axis-symmetrical shape, and are arranged on the first face so as to be symmetrical with respect to an axis along which a predetermined vibration node occurs when the vibrated member vibrates at the predetermined vibration mode.

2. The optical apparatus according to claim 1, wherein the vibrated member is a plate-like rectangular member and includes a pair of piezoelectric members that are respectively adhered near two sides facing the vibrated member, the first vibration detection electrode and the second vibration detection electrode are provided on at least either one of the pair of piezoelectric members, and vibrations in the vibrated member are generated due to two bending curves different from each other by one mode being produced by the drive unit with an offset time phase.

3. The optical apparatus according to claim 2, wherein the predetermined vibration node which serves as an axis of symmetry of the first vibration detection electrode and the second vibration detection electrode occurs in a direction parallel to a transportation direction of the foreign substance caused by vibrations of the vibrated member.

4. The optical apparatus according to claim 2, wherein only one of the first vibration detection electrode and the second vibration detection electrode is arranged with respect to a center axis parallel to a transportation direction of the foreign substance caused by vibrations of the vibrated member.

5. The optical apparatus according to claim 1, further comprising an image sensor for photoelectrically converting an effective luminous flux into an object image,
   wherein the vibrated member is an optical member arranged on an optical axis in front of the image sensor,
   wherein the piezoelectric member is adhered to the optical member in an external area of the effective luminous flux of the object image, and
   wherein the predetermined vibration node, which serves as an axis of symmetry of the first vibration detection electrode and the second vibration detection electrode, is located in the external area of the effective luminous flux of the object image.

6. The optical apparatus according to claim 1, wherein the determination unit is configured to determine that the vibrated member is vibrating in the predetermined vibration mode when output voltage values output from the first vibration detection electrode and the second vibration detection electrode obtained by the vibration detection unit are same voltage value, both the output voltage values are equal to or greater than a predetermined value, and when both the output voltage values are opposite phases.

* * * * *